United States Patent

Bruedigam et al.

[11] Patent Number: 5,999,875
[45] Date of Patent: Dec. 7, 1999

[54] METHOD AND DEVICE FOR CONTROLLING AN INTERNAL COMBUSTION ENGINE

[75] Inventors: Claus Bruedigam, Tegernheim, Germany; Klaus Eppinger, Toulouse, France; Alfred Brandl, Regensburg; Horst Jouvenal, Wiernsheim, both of Germany

[73] Assignee: Siemens Aktiengesellschaft, Munich, Germany

[21] Appl. No.: 09/019,272

[22] Filed: Feb. 5, 1998

[30] Foreign Application Priority Data

Feb. 5, 1997 [DE] Germany .......................... 197 04 313

[51] Int. Cl.$^6$ .................................................. F02D 41/22
[52] U.S. Cl. .......................... 701/110; 701/102; 123/399; 123/361; 123/198 D
[58] Field of Search .................................... 701/110, 104, 701/101, 102; 123/399, 361, 478, 479, 198 D

[56] References Cited

U.S. PATENT DOCUMENTS

| 4,854,283 | 8/1989 | Kiyono et al. ......................... 123/399 |
| 5,109,819 | 5/1992 | Custer et al. ............................ 123/399 |
| 5,339,782 | 8/1994 | Golzer et al. ............................ 123/399 |
| 5,429,092 | 7/1995 | Kamei .................................. 123/198 D |
| 5,476,078 | 12/1995 | Pfalzgraf et al. .................... 123/198 D |
| 5,602,732 | 2/1997 | Nichols et al. .......................... 123/399 |

FOREIGN PATENT DOCUMENTS

| 3844286A1 | 7/1990 | Germany . |
| 4133268A1 | 4/1993 | Germany . |
| 4406088A1 | 9/1994 | Germany . |

*Primary Examiner*—Willis R. Wolfe
*Assistant Examiner*—Hieu T. Vo
*Attorney, Agent, or Firm*—Herbert L. Lerner; Laurence A. Greenberg

[57] ABSTRACT

An internal combustion engine is provided with a first pedal position sensor and a second pedal position sensor measuring the position of an accelerator pedal. An emergency running mode of the internal combustion engine is actuated if a failure of either the first or the second pedal position sensor is detected. In the emergency running mode, a rise in the rotational speed or in the travel speed within a prescribed time interval is limited to a prescribed rise value.

9 Claims, 6 Drawing Sheets

METHOD AND DEVICE FOR CONTROLLING AN INTERNAL COMBUSTION ENGINE

BACKGROUND OF THE INVENTION

Field of the Invention

The invention relates to a method for controlling an internal combustion engine and a device for controlling an internal combustion engine. An internal combustion engine which has a drive train with a shaft is controlled by the following steps: measuring a rotational speed of a shaft of a drive train via a rotational speed sensor; measuring a first and a second pedal position of an accelerator pedal with first and second pedal position sensors where the first and second pedal position sensors provide continuous value range signals of the pedal position; determining whether or not the continuous value range signals of the first and second pedal position sensors are within acceptable tolerances; and implementing an emergency running mode of the internal combustion engine if one of the continuous value range signals is not within acceptable tolerances and deriving an actuation signal for an actuator of the internal combustion engine in the emergency running mode from the continuous value range signal which is within the acceptable tolerance for limiting a rise in the rotational speed within a prescribed time interval in the emergency running mode to a prescribed first rise value.

The invention also teaches a device for controlling an internal combustion engine having a drive train with a shaft, an actuator, and first and second pedal position sensors for measuring a position of an accelerator pedal and outputting measurement signals with a continuous value range.

A method and a device for controlling an internal combustion engine are described in German Patent Application DE 44 06 088 A1. The described internal combustion engine is assigned two pedal position sensors, and each sensor measures the position of an accelerator pedal. If a failure of one of the two pedal position sensors is detected, a control unit calculates an desired-value for the throttle valve position from the accelerator pedal position measured by the fault-free pedal position sensor. However, with the known method and with the known device there is the risk of a vehicle with an internal combustion engine accelerating in an uncontrolled fashion if the second pedal position sensor also fails.

SUMMARY OF THE INVENTION

It is accordingly an object of the invention to provide a method and a device for controlling an internal combustion engine, which overcomes the above-mentioned disadvantages of the prior art devices and methods of this general type, and which ensures a reliable and comfortable emergency running mode of the internal combustion engine.

With the foregoing and other objects in view there is provided, in accordance with the invention, a method for controlling an internal combustion engine which has a drive train with a shaft, a cylinder, and an actuator, which includes measuring a rotational speed of a shaft of a drive train of an internal combustion engine via a rotational speed sensor; measuring a first pedal position of an accelerator pedal with a first pedal position sensor, the first pedal position sensor providing a continuous value range measurement signal of the first pedal position; measuring a second pedal position of the accelerator pedal with a second pedal position sensor, the second pedal position sensor providing a continuous value range measurement signal of the second pedal position; determining whether or not the continuous value range measurement signal of the first pedal position sensor and the continuous value range measurement signal of the second pedal position sensor are within acceptable tolerances; and implementing an emergency running mode of the internal combustion engine if one of the continuous value range measurement signals is not within the acceptable tolerances and deriving an actuation signal for an actuator of the internal combustion engine during the emergency running mode from the continuous value range measurement signal which is within the acceptable tolerances for limiting a rise in the rotational speed within a prescribed time interval in the emergency running mode to a prescribed first rise value.

In accordance with an added feature of the invention, there is the step of controlling the prescribed first rise value as a function of a respective transmission ratio of a gearbox.

In accordance with another feature of the invention, there is the step of calculating an actual rise value of the rotational speed from a difference between the rotational speed at a start and at an end of a time interval, calculating a difference between the prescribed first rise value and the actual rise value, and suppressing the metered addition of fuel for at least one cylinder of the internal combustion engine if a difference between the actual rise value and the prescribed first rise value is smaller than a threshold value.

In accordance with another feature of the invention, there is the step of determining a desired value of torque at the shaft in the drive train as a function of the position of the accelerator pedal, calculating an actual rise value of the rotational speed from a difference between the rotational speed at a start and at an end of the time interval, calculating a difference between the prescribed first rise value and the actual rise value, and reducing the desired torque by a prescribed value if the difference is smaller than a threshold value.

With the foregoing and other objects in view there is also provided, in accordance with the invention, a method for controlling an internal combustion engine which has a drive train with a shaft and an actuator, which includes: measuring a rotational speed of a shaft of a drive train with a rotational speed sensor; measuring a first pedal position of an accelerator pedal with a first pedal position sensor, the first pedal position sensor providing a continuous value range measurement signal of the first pedal position; measuring a second pedal position of the accelerator pedal with a second pedal position sensor, the second pedal position sensor providing a continuous value range measurement signal of the second pedal position; determining whether or not the continuous value range measurement signal of the first pedal position sensor and the continuous value range measurement signal of the second pedal position sensor are within acceptable tolerances; actuating an emergency running mode of an internal combustion engine if one of the continuous value range measurement signals of the first and second pedal position sensors is not within the acceptable tolerances; and deriving an actuation signal for an actuator of the internal combustion engine upon an occurrence of the emergency running mode from the continuous value range measurement signal that is within the acceptable tolerances and periodically with a period duration of a prescribed time interval: determining again the rotational speed; calculating a maximum value of the rotational speed according to a formula:

$$N\_MAX_n = \text{MAX}(N\_MAX_{n-1} - N\_D1;\ N_{n-1} + N\_D2),$$

where $N\_MAX_n$ is a maximum value of the rotational speed at an end of a current time interval; $N\_MAX_{m-1}$ is a maximum value of the rotational speed at an end of a preceding time interval; $N_{n-1}$ is a rotational speed of the preceding time interval; and N_D1 is a first adapted value and N_D2 being a second adapted value; and limiting the rotational speed to the maximum value in the emergency running mode up to the end of the current time interval.

With the foregoing and other objects in view there is further provided, in accordance with the invention, a method for controlling an internal combustion engine of a motor vehicle which has an accelerator pedal, which includes measuring a travel speed of a motor vehicle with a travel speed sensor; measuring a first pedal position of an accelerator pedal with a first pedal position sensor, the first pedal position sensor providing a continuous value range measurement signal of the first pedal position; measuring a second pedal position of the accelerator pedal with a second pedal position sensor, the second pedal position sensor providing a continuous value range measurement signal of the second pedal position; determining whether or not the continuous value range measurement signal of the first pedal position sensor and the continuous value range measurement signal of the second pedal position sensor are within acceptable tolerances; actuating an emergency running mode of an internal combustion engine if one of the continuous value range measurement signals of the first and second pedal position sensors is not within the acceptable tolerances; and deriving an actuation signal for an actuator of the internal combustion engine upon an occurrence of the emergency running mode from the continuous value range measurement signal that is within the acceptable tolerances, and limiting a change in the travel speed over time in the emergency running mode to a prescribed second rise value.

In accordance with yet another feature of the invention, there is the further step of actuating the emergency running mode if a difference between the measured position of the accelerator pedal is greater than a prescribed threshold value.

With the foregoing and other objects in view there is provided, in accordance with the invention, a device for controlling an internal combustion engine which has a drive train with a shaft, an actuator, and first and second pedal position sensors for measuring a position of an accelerator pedal and outputting measurement signals with a continuous value range, the device includes a rotational speed sensor for measuring a rotational speed of a shaft in a drive train; a first means for implementing and controlling an emergency running mode of an internal combustion engine if one of first and a second pedal position pedal sensor malfunctions; second means for deriving an actuation signal for an actuator of the internal combustion engine in the emergency running mode from an accelerator pedal position measured by one of the first and the second pedal position sensors which is still functioning properly; and third means for limiting a change in the rotational speed within a prescribed time interval in the emergency running mode to a prescribed first rise value.

With the foregoing and other objects in view there is also provided, in accordance with the invention, a device for controlling an internal combustion engine which has a drive train with a shaft, an actuator, and first and second pedal position sensors for measuring a position of an accelerator pedal and outputting measurement signals with a continuous value range, the device includes a rotational speed sensor for measuring a rotational speed of a shaft in a drive train; a control device for implementing and controlling an emergency running mode of an internal combustion engine if one of a first and a second pedal position pedal sensor malfunctions; the control device deriving an actuation signal for an actuator of the internal combustion engine in the emergency running mode from an accelerator pedal position measured by one of the first and the second pedal position sensors which is properly functioning; and the control device limiting a change in the rotational speed within a prescribed time interval in the emergency running mode to a prescribed first rise value.

The method of the invention is distinguished by the fact that a rise in the rotational speed within a prescribed time interval is limited in the emergency running mode to a prescribed first rise value. As a result, the acceleration of the vehicle is limited. The first rise value here is advantageously selected in such a way that the vehicle can accelerate to such an extent that an overtaking procedure can be concluded.

The method is also distinguished by the fact that the rotational speed can rise rapidly again after a dip in rotational speed. This is extremely advantageous in particular in the case of a shifting procedure, since after the engagement of a gear the rotational speed can rise again in a short time to the value before the shifting procedure, and a good driving performance is thus ensured even in the emergency running mode of the vehicle.

The method is further distinguished by the fact that the change in the travel speed over time is limited in the emergency running mode to a prescribed, second rise value. As a result, particularly precise limitation of the acceleration of the vehicle is ensured.

Other features which are considered as characteristic for the invention are set forth in the appended claims.

Although the invention is illustrated and described herein as embodied in a method and device for controlling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
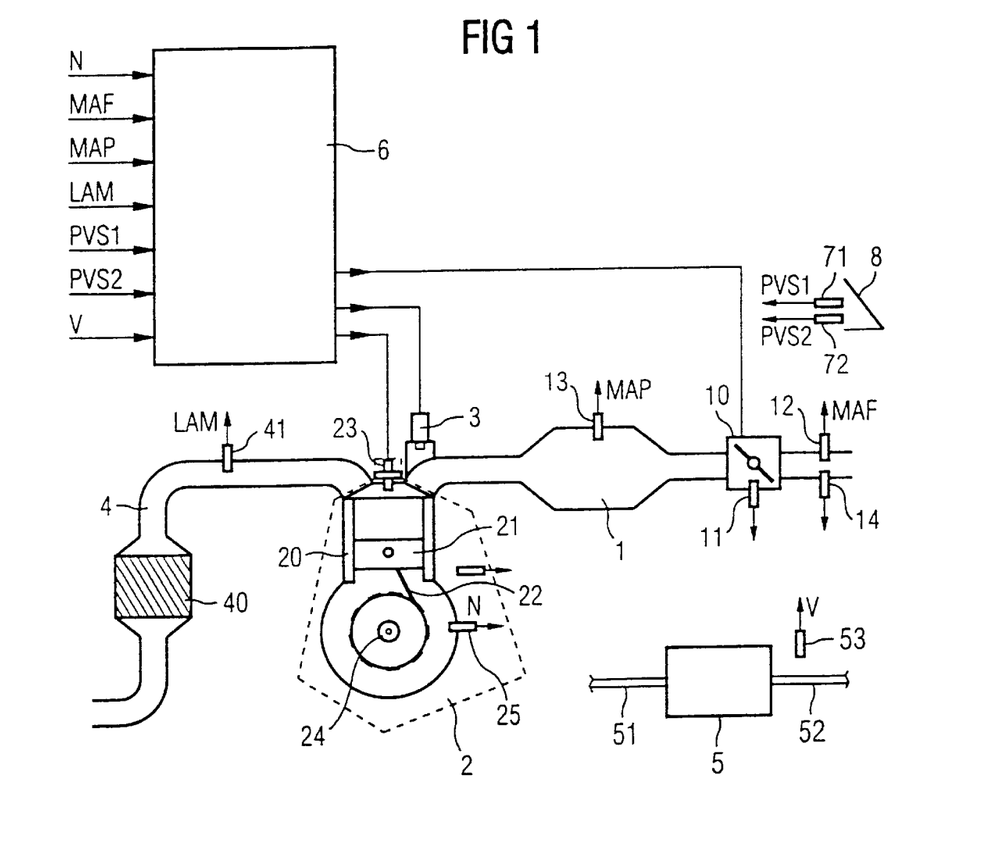
FIG. 1 is a diagrammatic and schematic view of an internal combustion engine and devices for controlling the internal combustion engine according to the invention.

Referring now to the figures of the drawing in detail and first, particularly, to FIG. 1 thereof, there is shown an internal combustion engine having an intake tract 1, in which a throttle valve 10 is disposed, and an engine block 2, which has a cylinder 20 and a crankshaft 24. A piston 21, a connecting rod 22 and a spark plug 23 are associated with the cylinder 20. The connecting rod 22 is connected to the piston 21 and to the crankshaft 24.

There is an injection valve 3, which is associated with an individual injection system and is disposed in the vicinity of the cylinder 20 in the intake tract 1. The internal combustion engine also has an exhaust gas tract 4, in which a catalytic converter 40 is disposed. The internal combustion engine is illustrated in FIG. 1 with one cylinder 20. However, it may also have a plurality of cylinders 20. The injection valve 3 may also be associated with a central injection system or to a direct injection system.

The internal combustion engine is also associated with a gearbox 5, whose drive shaft 51 is coupled to the crankshaft 24 via a non-illustrated clutch. The gearbox 5 also has an output shaft 52. A vehicle speed sensor 53 is provided for sensing a travel speed V of a vehicle.

A device 6 for controlling the internal combustion engine is also provided. The device 6 monitors various measured variables via sensors and determines one or more actuation signals as a function of at least one measured variable. In turn the actuation signals each control an actuator unit. The sensors include a first pedal position sensor 71, which measures a pedal position PV of an accelerator pedal 8; a second pedal position sensor 72, which measures the pedal position PV of the accelerator pedal 8; a throttle valve position sensor 11, which measures an actual value THR_AV of an opening angle of the throttle valve 10; an air mass flow rate meter 12, which measures an actual value MAF_AV of the air mass flow rate; an intake manifold pressure sensor 13, which measures an intake manifold pressure MAP; a temperature sensor 14, which measures an ambient temperature; a rotational speed sensor 25, which measures a rotational speed N of the crankshaft 24; and an oxygen probe 41, which measures the residual oxygen content of the exhaust gas and which provides an excess air factor LAM_V signal.

The first pedal position sensor 71 and the second pedal position sensor 72 generate a first signal PVS1 and a second signal PVS2, which represents the pedal position PV of the accelerator pedal and which continuously represents the actuation travel of the accelerator pedal and thus has a continuous value range.

Operating variables include the measured variables and variables derived therefrom, such as ambient pressure. The actuator units comprise in each case an actuator drive and an actuator. The actuator drive is an electromotive drive, an electromagnetic drive, a mechanical drive or a further drive known to the person skilled in the art. The actuators are configured as the throttle valve 10, the injection valve 3, the spark plug 23 and a changeover switch between two different intake manifold lengths. Below, reference is made in each case to the actuator units with the associated actuator.

The device 6 for controlling the internal combustion engine is preferably configured as an electronic engine controller 6. However, it may also be a plurality of control units, which re electrically conductively connected to one another, for example via a bus system.

Figure 2:
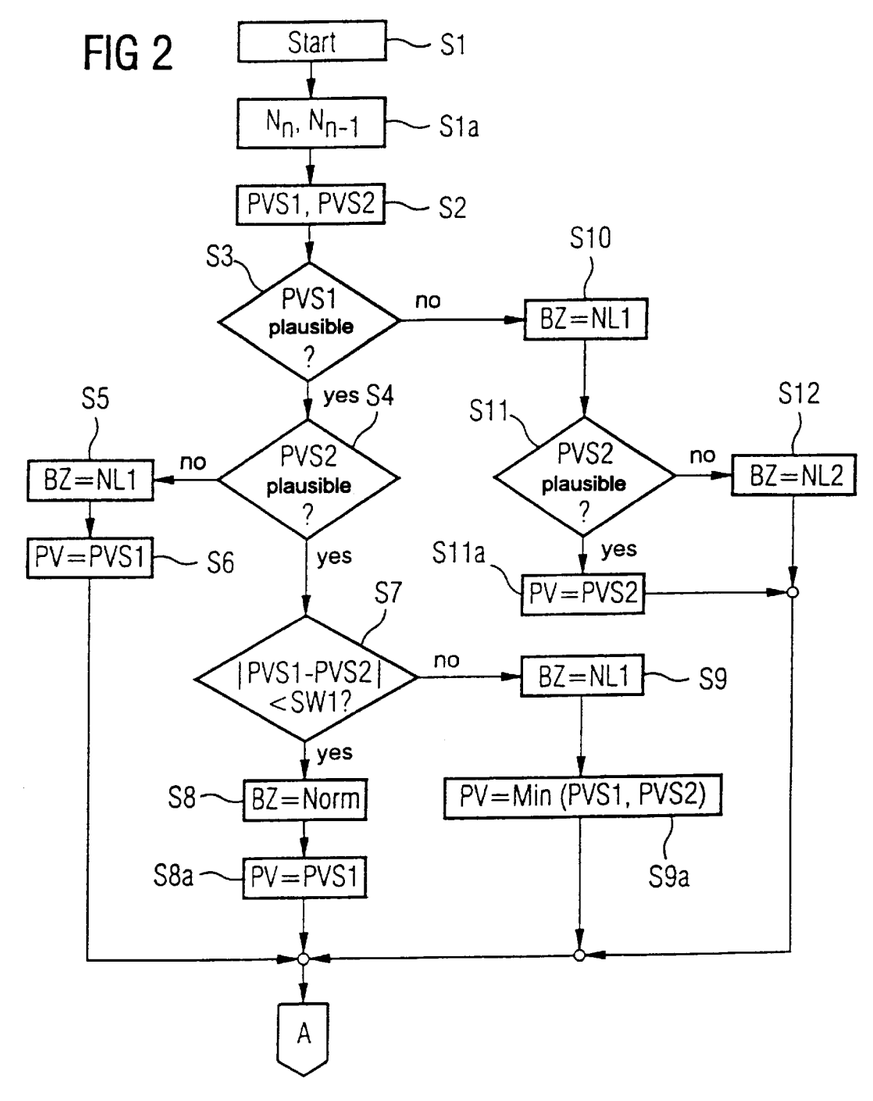
FIG. 2 is a first part flowchart of a first embodiment of the invention.

In a first embodiment of the invention shown in FIG. 2, the method according to the invention is started in step S1. It is started in each case after a prescribed time interval has expired, for example 100 milliseconds, i.e. cyclically, while the internal combustion engine is operating.

In step S1a, a current rotational speed $N_n$ of a current time tn is measured. In addition, a rotational speed which was measured at the previous start of the method is called from memory and assigned to a rotational speed $N_{n-1}$ at a time $t_{n-1}$. The current rotational speed $N_n$ is stored in the memory for the future testing procedures.

In step S2, a first signal PVS1 and a second signal PVS2 are measured. In step S3 it is checked whether the first signal has a plausible value. To do this, it is checked whether the first signal PVS1 is in an acceptable voltage range, for example between 0.5 V and 4.5 V. If this is the case, the system branches to step S4 in which it is checked, as in step S3, whether the second signal PVS2 has a plausible value. If the second signal is not plausible, the system branches to step S5, in which it changes into an operating state BZ of a first emergency running mode NL1. Then, in step S6, the position PV of the accelerator pedal is determined from the first signal PVS1.

If the signal in step S4 is detected as being plausible, the system branches to step S7, in which it is checked whether the absolute value of the difference between the first and the second signals PVS1, PVS2 is smaller than a prescribed threshold value SW1. If this is the case, the system branches to step S8, in which the system changes into the operating state BZ normal NORM. In step S8a, the position PV of the accelerator pedal is then determined from the first signal PVS1.

If the condition of step S7 is not fulfilled, the system branches to step S9, and the operating state BZ changes to the first emergency running mode NL1. It is not possible to determine which pedal position sensor 71, 72 is actually faulty. Therefore, in step S9a, the position PV of the accelerator pedal 8 is calculated from a minimum selection of the first and second signals PVS1, PVS2.

The form of the condition in step S7 is not essential to the invention. Therefore, there may also be provisions for a test to determine whether the sum of the first and the second signals PVS1, PVS2 is equal to the prescribed threshold value SW1, or whether the ratio of the first signal PVS1 to the second signal PVS2 is smaller or bigger than the prescribed threshold value SW1.

If the first signal PVS1 in step S3 is not plausible, the system branches to the step S10, in which the operating state BZ changes into the first emergency running mode NL1.

In step S11, it is checked whether the second signal PVS2 is plausible. To do this, there is preferably a test to determine whether a brake of the vehicle is activated, which can be detected, for example, from a brake light switch signal. A comparison is made to determine whether, when the brake is activated, the second signal PVS2 has a value (for example <0.7 V) which represents an idling position of the accelerator pedal 8. If this is not the case, the system branches to step S12, and the operating state BZ changes to a second emergency running mode NL2. In the second emergency running mode NL2, both the first and the second pedal position sensors 71, 72 are detected as being faulty. Otherwise, the system branches to step S11a, in which the position PV of the accelerator pedal 8 is determined from the second signal PVS2.

Figure 3:
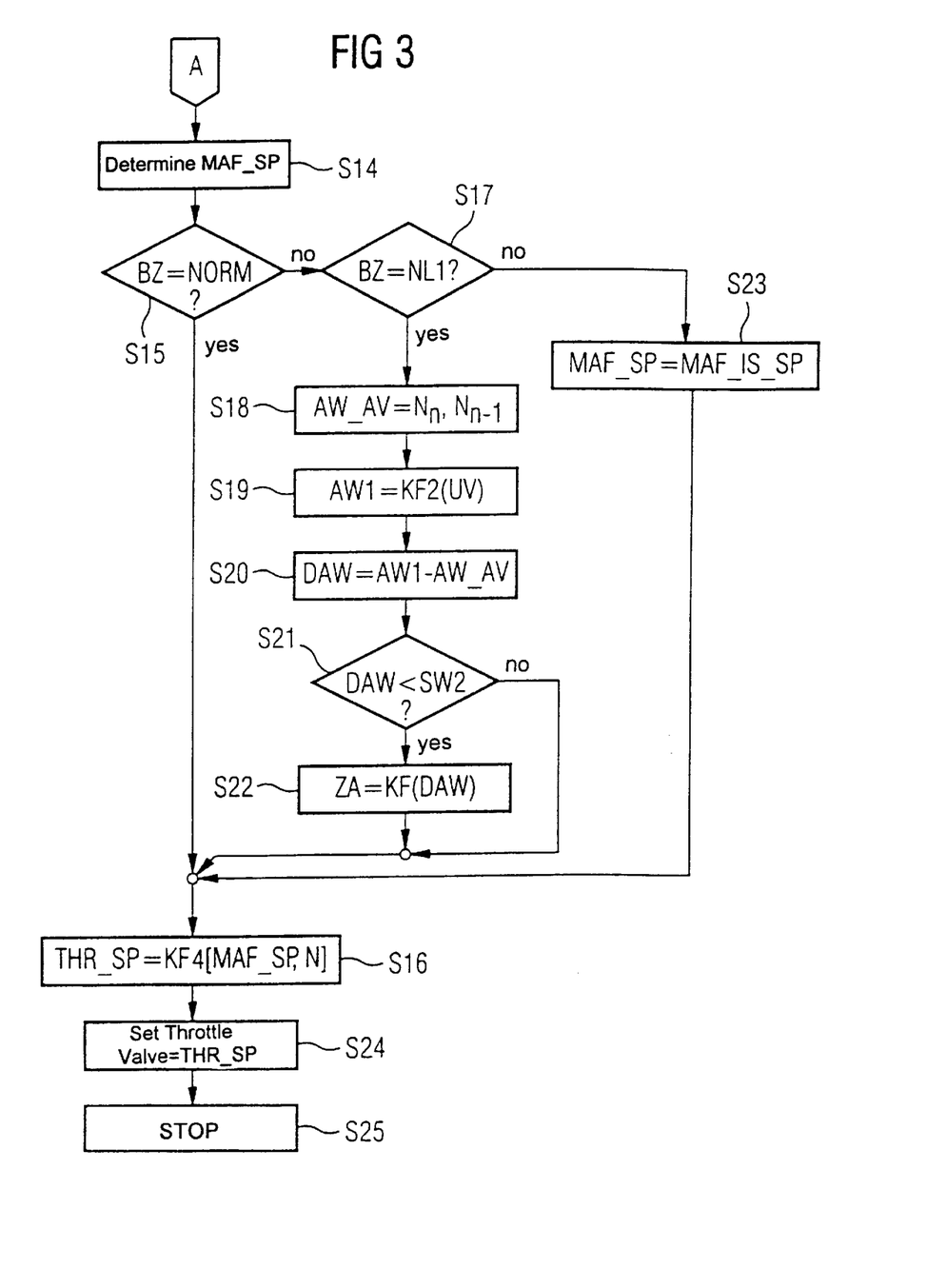
FIG. 3 is a second part flowchart of the first embodiment.

In step S14 shown in FIG. 3, a desired value MAF_SP of the air mass flow rate is determined. The desired value MAF_SP of the air mass flow rate is determined from a first characteristic diagram as a function of the pedal position and of the rotational speed N and/or of further operating variables. In a more refined embodiment of the invention, a physical model of the intake tract 1 is provided, which models the dynamic behavior of the air mass flow rate in the intake tract 1 and is used to calculate the desired value MAF_SP of the air mass flow rate.

In step S15, it is determined whether the internal combustion engine is in the normal NORM operating state. If this is the case, the system branches to step S16. Otherwise, the system branches from step S17 to step S18 if the operating state BZ is equal to the first emergency running mode NL1.

In step S18, an actual rise value AW_AV is calculated from the difference between the rotational speed N at the current time n and the rotational speed N at the time n-1.

In step S19, a prescribed first rise value AW1 is determined from a second characteristic diagram KF2 as a function of a transmission ratio UV of the gearbox. In step S20, a difference rise time DAW is determined from the difference between the prescribed first rise value AW1 and the actual rise value AW_AV.

In step S21, it is determined whether the differential rise value DAW is smaller than a second threshold value SW2. If this is the case, the system branches to step S22 in which a cylinder shut-off pattern ZA is obtained from a third characteristic diagram KF3 as a function of the differential rise value DAW or from a table. Such a method is described in European Patent Application No. 0 614 003 A1, whose contents are incorporated by reference herein.

If the first or the second pedal position sensor 71, 72 has failed, and then, respectively, the second or first pedal position sensor 71, 72 additionally fails, this can, under certain circumstances, be detected only if the brake is activated.

However, if a driver then does not activate the brake, because he, for example, does not know how he should react, an excessively high desired value MAF_SP of the air mass flow rate is calculated as a function of the sensed position PV of the accelerator pedal 8. As a result of the metering of fuel to individual cylinders 20 in accordance with the cylinder shut-off pattern ZA, which was determined in step S22, an uncontrolled acceleration of the vehicle does not occur. The driver can then react correctly and activate the brake.

The third characteristic diagram KF3 is determined by engine test bed trails and analysis and is applied in such a way that, by shutting off the cylinders via an actuation variable, the rise in the rotational speed N in the time interval is limited to the first rise value AW1.

The second characteristic diagram KF2 is determined by road trials and is applied in such a way that the vehicle does not accelerate to an unacceptable degree but, nevertheless, a comfortable traveling mode is possible.

In step S22, an ignition angle adjustment could also be set as a function of the differential rise value DAW.

If the condition in step S21 is not fulfilled, processing is continued directly in step S16.

If in step S17, the internal combustion engine is not in the operating state of the first emergency running mode NL1, it is in the operating state BZ of the second emergency running mode NL2, and processing is continued in step S23. In step S23, an idling desired-value MAF_IS_SP of the air mass flow rate is assigned to the desired value MAF_SP of the air mass flow rate.

In step S16, a desired value THR_SP is determined from a fourth characteristic diagram KF4 as a function of the desired value MAF_SP of the air mass flow rate and of the rotational speed N.

In step S24, the throttle valve 10 is set in accordance with the desired value THR_SP of the opening angle of the throttle valve 10. To this end, an appropriate regulator is provided in the device 6 for controlling the internal combustion engine. The regulator preferably has proportional, integral and differential characteristics and whose regulating difference is formed from the desired value THR_SP and the actual value THR_AV of the opening angle. If the throttle valve has an intelligent actuator drive, the actuator drive also includes the regulator. In step S25, the method is then ended. It is preferably started periodically.

Figure 4:
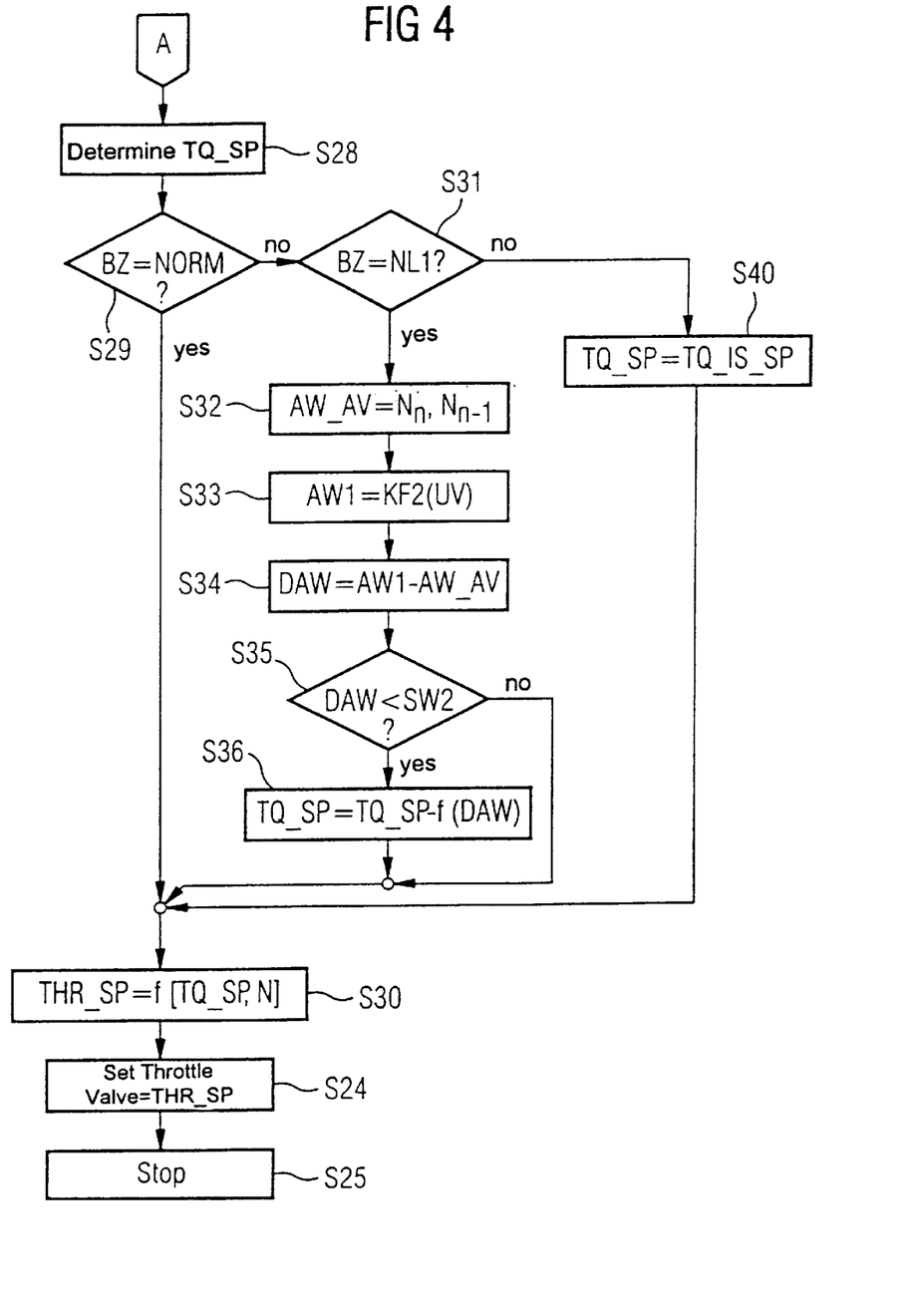
FIG. 4 is a second part flowchart of a second embodiment of the invention.

A second exemplary embodiment of the invention is shown in FIG. 4. In step S28, a desired value TQ_SP of the torque is determined at a shaft in the drive train of the internal combustion engine. The drive train includes the internal combustion engine and the gearbox 5, which is configured as a manual shift gearbox, an automatic gearbox or an infinitely variable change-speed gearbox. The shaft in the drive train is the crankshaft 24 or the output shaft 52 of the gearbox 5. The desired value TQ_SP of the torque is determined as a function of the position PV of the accelerator pedal 8, the rotational speed N and, if appropriate, further operating variables. Moreover, it can also be advantageous to take into account the prescribed torque values of a traction control system, of an idling controller, of an engine torque controller or of a cruise control.

In step S29, it is determined whether the internal combustion engine is in the normal NORM operating state BZ. If this is the case, processing is continued in step S30. Otherwise, the system branches from step S31 to step S32 if the internal combustion engine is in the operating state BZ of the first emergency running mode NL1. In the mode, the actual rise value AW_AV is calculated from the difference between the rotational speed N at the current time n and the rotational speed N at the time n-1.

In step S33, the first rise time AW1 is determined from the second characteristic diagram KF2 as a function of the transmission ratio UV. In a simple embodiment of the invention, the first rise value AW1 is a permanently prescribed value.

In step S34, the differential rise value DAW is calculated from the difference between the first rise value AW1 and the actual rise value AW_AV. In step S35, it is determined whether the difference rise-value DAW is smaller than the second threshold value SW2. If this is not the case, processing is continued in step S30. Otherwise, processing is continued in step S36 in which the desired value TQ_SP of the torque is reduced as a function of the differential rise value DAW. The reduction value is determined from a fifth characteristic diagram or with a function. The function can contain an integral of the differential rise value DAW.

The fifth characteristic diagram is determined by engine test bed trials and is applied in such a way that the rise in the rotational speed N in the time interval is limited to the first rise value AW1.

If, in step S31, the internal combustion engine is not in the operating state BZ of the first emergency running mode NL1, it is in the operating state BZ of the second emergency running mode NL2. In step S40, an idling desired-value TQ_IS_SP of the torque is assigned to the desired value TQ_SP of the torque. Processing is then continued in step S30. In step S30, a desired value of the indicated torque, which takes into account losses as a result of friction, the gas cycle and the assemblies, is specified.

Figure 5:
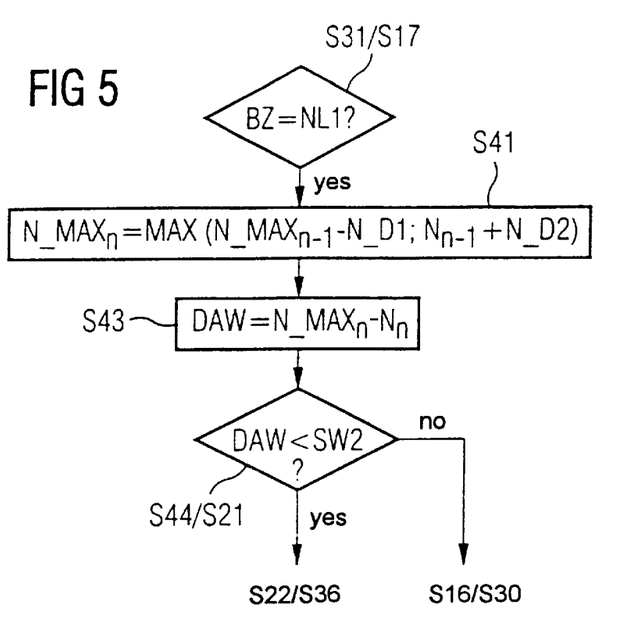
FIG. 5 is a partial second part flowchart in accordance with FIGS. 3 or 4 corresponding to a third embodiment of the invention.

A third exemplary embodiment is shown in FIG. 5. Processing in accordance with step S17 and/or step S31 is continued in step S41 if the condition of step S31/S17 is fulfilled. Here, a maximum value $N\_MAX_n$ at the current time n is determined by a maximum selection from the difference between the maximum value $N\_MAX_{n-1}$ at the time n−1 and a first adapted value N_D1 and the sum of the rotational speed $N_{n-1}$ at the time n−1 and a second adapted value N_D2. The first adapted value N_D1 and the second adapted value N_D2 are selected in such a way that, in the case of a shifting procedure with a sudden reduction in rotational speed which is associated therewith, a rapid rise in the rotational speed is possible again after the shifting procedure. This results in a comfortable traveling mode in the first emergency running mode NL1 of the internal combustion engine.

In step S43, the differential rise value DAW is determined from the difference between the maximum value $N\_MAX_n$ at the time n and the rotational speed $N_n$ at the time n. In step S44, it is then checked whether the differential rise value DAW is smaller than a second threshold value SW2. If this is the case, processing is continued in step S22 and/or in the step S36. If this is not the case, the processing is continued in the step S16 and/or in the step S30.

Figure 6:
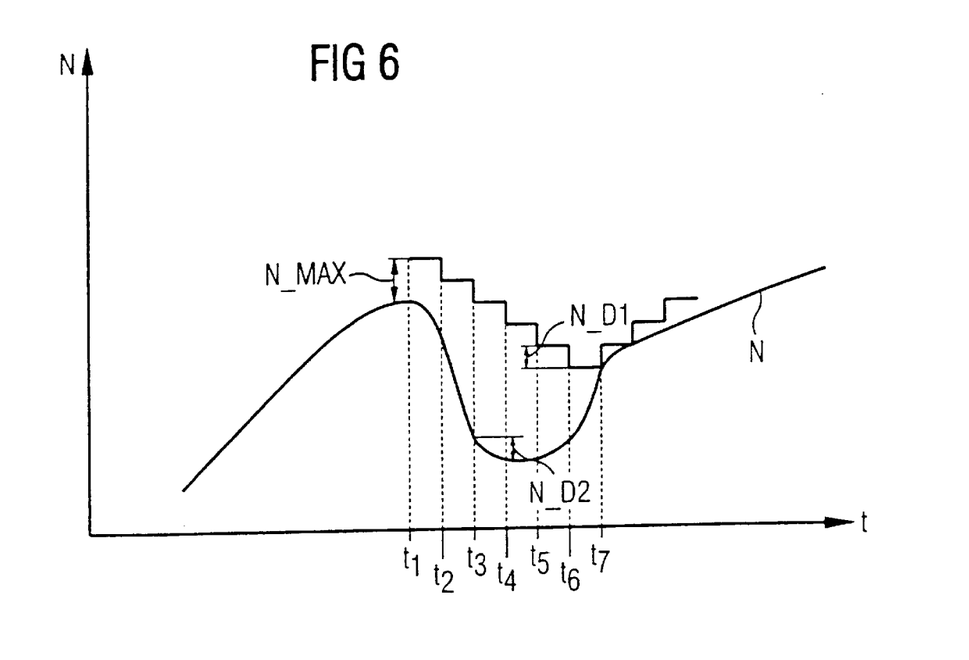
FIG. 6 is a graph showing a rotational speed N plotted over time t in accordance with the third embodiment according to FIG. 5.

In FIG. 6, the profile of the rotational speed N and of the maximum value N_MAX over time in accordance with the exemplary embodiment according to FIG. 5 is plotted by way of example. Up to the time t1, the rotational speed rises approximately linearly. From the time t1 and during the times t2, t3 and t4, the rotational speed decreases strongly. This is caused, for example, by a shifting procedure. From the time t4 onwards, the rotational speed N rises strongly until it then continues to rise approximately linearly again from the time t7.

From the profile of the maximum value N_MAX it is clear that an acceptable rise in the rotational speed N per time interval during the shifting procedure is higher than outside the shifting procedure. Thus, a particularly comfortable emergency running mode of the internal combustion engine, in which shifting procedures can be carried out as in the normal NORM operating state, is ensured.

At the time t7, the shifting procedure is ended and the rotational speed lies below the rotational speed N at the time t1, that is to say at the start of the shifting procedure, and also rises with a low gradient. This corresponds to shifting up into a higher gear. From the profile of the maximum value N_MAX it is clear that the acceptable rise in the rotational speed N per time interval during the shifting procedure is higher than when not in the shifting procedure. Thus, a particularly comfortable emergency running mode of the internal combustion engine, in which shifting procedures can be carried out as in the normal NORM operating state, is ensured.

However, when the internal combustion engine is not in the shifting procedure, the rotational speed N is limited by the maximum value N_MAX in such a way that an unacceptably strong acceleration of the vehicle is not possible. The first adapted value N_D1 is determined in road trials and is adapted in such a way that, even in the first emergency running mode NL1, a typical shifting procedure can be carried out without the rotational speed N being limited. The second adapted value N_D2 is, on the other hand, determined in road trials in such a way that, outside a shifting procedure, the rotational speed is limited to the prescribed, first rise value AW1. The time interval between the respectively directly adjacent times t1 to t7 corresponds in each case to the prescribed time interval. Accordingly, the method according to the invention is started at each time t1 to t7, and the respectively current time then corresponds to the time n, and the time of the last call corresponds to the time n−1.

The maximum value N_MAX can also be determined just from the rotational speed at the time n−1 and the second adapted value N_D2 after a prescribed number of time intervals after the start of a shifting procedure.

Figure 7:
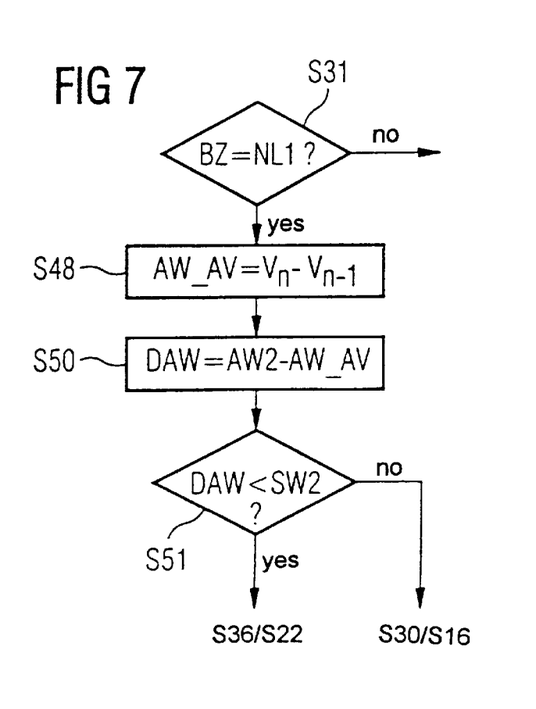
FIG. 7 is a partial second part flowchart in accordance with FIGS. 3 or 4 corresponding to a fourth embodiment.

FIG. 7 shows a fourth embodiment of the invention. In contrast to FIG. 4, processing is continued in step S48 if the operating state BZ of the internal combustion engine is in the first emergency running mode NL1. This is determined in step S31, but can also be tested in step S17 as in FIG. 3.

In step S48, the actual rise value AW_AV is calculated from the difference between the travel speed V at the current time n and the speed V at the time n−1. In the embodiment, the travel speed V is measured in step S1a in accordance with FIG. 2 as an alternative to, or in addition to, the rotational speed N. The speed V at the time n−1 is read out of the memory in step S1a. In the exemplary embodiment, the actual rise value AW_AV corresponds directly to the acceleration of the vehicle.

In step S50, the differential rise value DAW is calculated from a difference between a prescribed second rise value AW2 and the actual rise value AW_AV. In step S51, it is then determined whether the differential rise value DAW is smaller than the threshold value SW2. If this is the case, processing is continued in step S36 or in step S22. If this is not the case, processing is continued in step S30 or in step S16.

We claim:

1. An apparatus for controlling an internal combustion engine having a drive train with a shaft, an actuator, and first and second pedal position sensors for measuring a position of an accelerator pedal and outputting measurement signals with a continuous value range, the device comprising:

a rotational speed sensor for measuring a rotational speed of a shaft in a drive train;

a control device for implementing and controlling an emergency running mode of an internal combustion engine if one of a first and a second pedal position pedal sensor malfunctions;

said control device deriving an actuation signal for an actuator of the internal combustion engine in said emergency running mode from an accelerator pedal position measured by one of the first and the second pedal position sensors which is properly functioning; and said control device limiting a change in the rotational speed within a prescribed time interval in said emergency running mode to a prescribed first rise value.

2. A device for controlling an internal combustion engine having a drive train with a shaft, an actuator, and first and second pedal position sensors for measuring a position of an accelerator pedal and outputting measurement signals with a continuous value range, the device comprising:

a rotational speed sensor for measuring a rotational speed of a shaft in a drive train;

first means for implementing and controlling an emergency running mode of an internal combustion engine if one of a first and a second pedal position pedal sensor malfunctions;

second means for deriving an actuation signal for an actuator of the internal combustion engine in said emergency running mode from an accelerator pedal position measured by one of the first and the second pedal position sensors which is still functioning properly; and third means for limiting a change in the rotational speed within a prescribed time interval in said emergency running mode to a prescribed first rise value.

3. A method for controlling an internal combustion engine having a drive train with a shaft, at least one cylinder, and an actuator, which comprises:

measuring a rotational speed of a shaft of a drive train of an internal combustion engine via a rotational speed sensor;

measuring a first pedal position of an accelerator pedal with a first pedal position sensor, the first pedal position sensor providing a continuous value range measurement signal of the first pedal position;

measuring a second pedal position of the accelerator pedal with a second pedal position sensor, the second pedal position sensor providing a continuous value range measurement signal of the second pedal position;

determining if the continuous value range measurement signal of the first pedal position sensor and the continuous value range measurement signal of the second pedal position sensor are within acceptable tolerances; and implementing an emergency running mode of the internal combustion engine if one of the continuous value range measurement signals is not within the acceptable tolerances and deriving an actuation signal for an actuator of the internal combustion engine during the emergency running mode from the continuous value range measurement signal within the acceptable tolerances for limiting a rise in the rotational speed within a prescribed time interval in the emergency running mode to a prescribed first rise value.

4. The method according to claim 3, which comprises controlling the prescribed first rise value as a function of a respective transmission ratio of a gearbox.

5. The method according to claim 3, which comprises calculating an actual rise value of the rotational speed from a difference between the rotational speed at a start and at an end of a time interval, calculating a difference between the prescribed first rise value and the actual rise value, and suppressing the metered addition of fuel for at least one cylinder of the internal combustion engine if a difference between the actual rise value and the prescribed first rise value is smaller than a threshold value.

6. The method according to claim 3, which comprises determining a desired value of torque at the shaft in the drive train as a function of the position of the accelerator pedal, calculating an actual rise value of the rotational speed from a difference between the rotational speed at a start and at an end of a time interval, calculating a difference between the prescribed first rise value and the actual rise value, and reducing the desired torque by a prescribed value if the difference is smaller than a threshold value.

7. A method for controlling an internal combustion engine having a drive train with a shaft and an actuator, which comprises:

measuring a rotational speed of a shaft of a drive train with a rotational speed sensor;

measuring a first pedal position of an accelerator pedal with a first pedal position sensor, the first pedal position sensor providing a continuous value range measurement signal of the first pedal position;

measuring a second pedal position of the accelerator pedal with a second pedal position sensor, the second pedal position sensor providing a continuous value range measurement signal of the second pedal position;

determining if the continuous value range measurement signal of the first pedal position sensor and the continuous value range measurement signal of the second pedal position sensor are within acceptable tolerances;

actuating an emergency running mode of an internal combustion engine if one of the continuous value range measurement signals of the first and second pedal position sensors is not within the acceptable tolerances; and deriving an actuation signal for an actuator of the internal combustion engine upon an occurrence of the emergency running mode from the continuous value range measurement signal is within the acceptable tolerances and periodically with a period duration of a prescribed time interval:

determining again the rotational speed;

calculating a maximum value of the rotational speed according to a formula:

$$N\_MAX_n = MAX(N\_MAX_{n-1} - N\_D1; N_{n-1} + N\_D2),$$

where $N\_MAX_n$ is a maximum value of the rotational speed at an end of a current time interval;

$N\_MAX_{m-1}$ is a maximum value of the rotational speed at an end of a preceding time interval;

$N_{n-1}$ is a rotational speed of the preceding time interval; and $N\_D1$ is a first adapted value and $N\_D2$ being a second adapted value; and limiting the rotational speed to the maximum value in the emergency running mode up to the end of the current time interval.

8. A method for controlling an internal combustion engine of a motor vehicle having an accelerator pedal, which comprises:

measuring a travel speed of a motor vehicle with a travel speed sensor;

measuring a first pedal position of an accelerator pedal with a first pedal position sensor, the first pedal position sensor providing a continuous value range measurement signal of the first pedal position;

measuring a second pedal position of the accelerator pedal with a second pedal position sensor, the second pedal position sensor providing a continuous value range measurement signal of the second pedal position;

determining if the continuous value range measurement signal of the first pedal position sensor and the continuous value range measurement signal of the second pedal position sensor are within acceptable tolerances;

actuating an emergency running mode of an internal combustion engine if one of the continuous value range measurement signals of the first and second pedal position sensors is not within the acceptable tolerances; and deriving an actuation signal for an actuator of the internal combustion engine upon an occurrence of the emergency running mode from the continuous value range measurement signal within the acceptable tolerances, and limiting a change in the travel speed over time in the emergency running mode to a prescribed second rise value.

9. The method according to claim 3, which comprises actuating the emergency running mode if a difference between the measured position of the accelerator pedal is greater than a prescribed threshold value.

* * * * *